Figure 1:
Figure 2:

J. Stowe,

Fracture App's.

No. 106,091.  Patented Aug. 2, 1870.

Witnesses.
Chas. F. Sleeper.
Oscar L. Greene

Inventor.
John Stowe
by J. E. Maynadier
his atty.

United States Patent Office.

JOHN STOWE, OF LAWRENCE, MASSACHUSETTS.

Letters Patent No. 106,091, dated August 2, 1870.

IMPROVEMENT IN APPARATUS FOR THE TREATMENT OF FRACTURE OF THE LOWER JAW.

The Schedule referred to in these Letters Patent and making part of the same.

I, JOHN STOWE, of Lawrence, in the county of Essex and State of Massachusetts, have invented an Apparatus for the Treatment of a Fracture of the Lower Jaw Bone, of which the following is a specification.

The drawing shows two views of the apparatus in use.

My invention consists of two main parts—

First, a splint of a shape to correspond with the lower jaw, and sufficiently rigid to keep the parts of the fractured bone in place, and Secondly, of a head-piece, formed to fit the top of the head, and serve as a support to the splint; these two parts being connected together by straps, so that the splint will be held in place by the head-piece.

In the drawing—

A is the head-piece.

B, the splint.

C and C', the side straps, and

D, the back strap.

The bodies of the head-piece and of the splint are formed of perforated tin, stiffened by having a wire soldered to them near their edges; they are shaped to correspond with the upper part of the head and with the lower jaw, and are lined with cloth.

When in use folds of linen or cotton are interposed between the jaw and the splint. Straps are attached to this splint, as shown, and these straps are buckled to corresponding straps attached to the head-piece.

By loosening one of these straps at a time, any wounds on the side of the head or jaw can be dressed without disturbing the splint; the apparatus can be tightened or loosened at any point, as the swelling increases or diminishes; any uncomfortable bearing of the head-piece can be relieved by a slight change of its position, and this change of position can be made by lengthening or shortening the straps on either side and behind, without disturbing the equal bearing of the splint.

I claim as my invention—

The combination of the splint and head-piece, substantially as described.

JOHN STOWE.

Witnesses:
HORACE C. BACON,
ARTHUR W. DYER,
FRED. W. MCLANATHAN.